Sept. 27, 1927.
A. L. KERN
1,643,776
AUTOMOBILE BUMPER
Filed Dec. 29, 1926
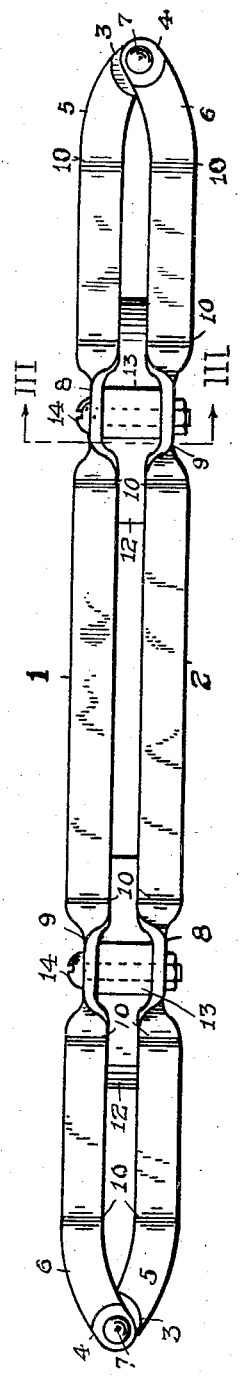
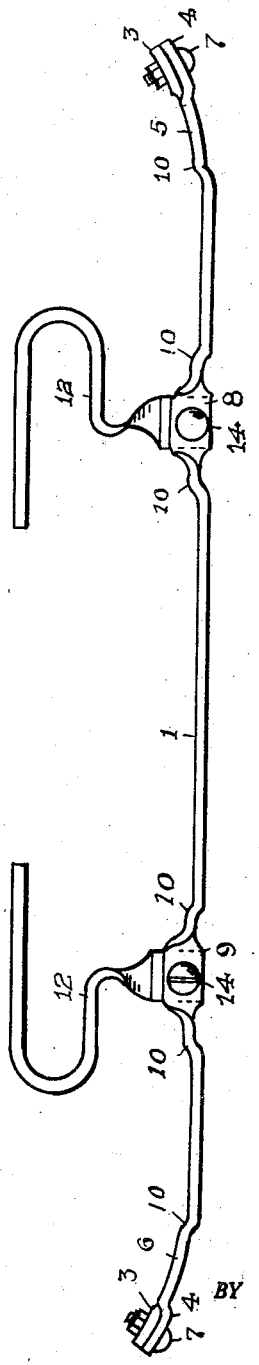
INVENTOR.
Albert L. Kern
BY Jack B. Ingler
ATTORNEY Patented Sept. 27, 1927.

1,643,776

UNITED STATES PATENT OFFICE.

ALBERT L. KERN, OF AURORA, ILLINOIS.

AUTOMOBILE BUMPER.

Application filed December 29, 1926. Serial No. 157,689.

This invention relates to an automobile bumper and important objects thereof are to provide a bumper of the character described, which embodies relatively few parts, which is simple in its construction and arrangement, strong, durable and efficient in its use, attractive in appearance, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

In the drawing forming a part of this specification and wherein like numerals of reference designate corresponding parts throughout the several views:—

Figure 1 is a front view of an automobile bumper constructed in accordance with the invention.

Figure 2 is a top plan view thereof.

Figure 3 is a cross sectional view on line III—III, Figure 1.

Referring in detail to the drawing 1 and 2 respectively denote upper and lower horizontally extending bumper bars, which are exact counterparts of each other. The bars 1 and 2 are flat and positioned edgewise and extend parallel, relatively to each other, throughout their length, with the exception of the converging ends 3 and 4, thereof. The upper bar 1 is disposed directly above the lower bar 2 and is in vertical alignment with and uniformly spaced from the latter.

The end portions 5 and 6, of each of the bars 1 and 2 are curved rearwardly as clearly shown in Figure 2. The ends 3 of each of the bars 1 and 2 are rearwardly offset, and the ends 4 thereof are forwardly offset. The end 3 of the bar 1 connects with the end 4, of the bar 2, and the end 4 of the bar 1 connects with the end 3 of the bar 2. These bar end connections are secured by means of bolts 7, or in any other suitable manner. By offsetting the bar ends 3 and 4, in the manner stated, the vertical edgewise alignment of bars 1 and 2, relatively to each other, is established and maintained throughout their entire length.

Each of the bars 1 and 2 is provided with a pair of flatly disposed support bearings, respectively indicated at 8 and 9, which are formed by twisting short portions of the bars 1 and 2 to extend at right angles with respect to the edgewise disposition of the main portions of the bars 1 and 2. The support bearings 8 and 9 are spaced from each other and are further equally spaced from respective bar ends to position the same to accommodate supporting attachments fixed to an automobile chassis of conventional width.

The end portions 5 and 6 and the support bearings 8 and 9, of each of the bumper bars 1 and 2, are rearwardly offset, as indicated at 10, for the purpose of re-enforcement and further to dispose the supporting bearings 8 and 9 so that the front edges thereof will extend flush or on an even plane with the front face of the bumper bars 1 and 2, clearly shown in Figure 2.

Each of the support bearings 8 and 9 is provided with an aperture 11. The support bearing 8, of the upper bar 1, together with its aperture 11, is vertically aligned with respect to the support bearing 9 and the associated aperture 11, of the lower bar 2.

The bumper bars 1 and 2 are carried by a pair of suitable resilient supports 12, the rear ends of which are adapted for connection with an automobile chassis, in the usual manner. The forward ends 13, of the supports 12, are preferably rectangular in contour and are disposed intermediate of each pair of associated support bearings 8 and 9, of respective bars 1 and 2. The supports 12 are fixed in respective pairs of support bearings 8 and 9, by means of vertically disposed bolts 14. The latter extend through the support bearing apertures 11 and through aligned apertures 15, which are provided therefor in the rectangularly shaped forward ends 13, of the supports 12, and which register with the support bearing apertures 11.

The front faces of the support forward ends 13 extend flush with the front edges of the support bearings 8 and 9 and also with the front face of the main portions of the bars 1 and 2. By this arrangement of the parts, no portion of the device will project beyond the front face of the bumper bars 1 and 2 whereby the shock of a collision will be more equally distributed throughout the entire length of the bumper.

What I claim is:

1. In an automobile bumper, a pair of spaced flat bumper bars disposed vertically edgewise, said pair of bars provided with support bearings formed by twisting portions of each of said pair of bars to extend at right angles relatively to the edgewise disposition of said pair of bars.

2. In an automobile bumper, a flat upper bar, a flat lower bar, said upper and lower bars disposed vertically edgewise and extending parallel in spaced relation with respect to each other, said upper and lower bars provided with support bearings formed by twisting portions thereof to extend at right angles relatively to the edgewise disposition of the said upper and lower bars.

3. In an automobile bumper, a flat upper bar, a flat lower bar, said upper and lower bars disposed vertically edgewise and extending parallel in spaced relation with respect to each other, said upper and lower bars provided with support bearings formed by twisting portions thereof to extend at right angles relatively to the edgewise disposition of the said upper and lower bars, the respective ends of said upper and lower bars being connected together.

4. In an automobile bumper, a flat upper bar, a flat lower bar, said upper and lower bars disposed vertically edgewise and extending parallel in spaced relation with respect to each other, said upper and lower bars provided with support bearings formed by twisting portions thereof to extend at right angles relatively to the edgewise disposition of the said upper and lower bars, the respective ends of said upper and lower bars being connected together, the forward edges of said support bearings being flush with the front face of said bars.

5. In combination, an automobile bumper comprising a flat upper bar, a flat lower bar, said upper and lower bars disposed vertically edgwise and extending parallel in spaced relation with respect to each other, said upper and lower bars being connected together at respective ends thereof, said bar ends being offset to establish the vertical alignment thereof relatively to each other, said upper and lower bars provided with associated support bearings formed by twisting portions thereof to extend at right angles relatively to the edgewise disposition of said upper and lower bars, said support bearings being disposed rearwardly to position the forward edges thereof on an even plane with the front face of respective upper and lower bars, and means connecting with said support bearings and being adapted to be attached to an automobile.

6. In combination, an automobile bumper comprising a flat upper bar, a flat lower bar, said upper and lower bars disposed vertically edgewise and extending parallel in spaced relation wth respect to each other, said upper and lower bars being connected together at respective ends thereof, said bar ends being offset to establish the vertical alignment thereof relatively to each other, said upper and lower bars provided with associated support bearings formed by twisting portions thereof to extend at right angles relatively to the edgewise disposition of said upper and lower bars, said support bearings being disposed rearwardly to position the forward edges thereof on an even plane with the front face of respective upper and lower bars, said upper and lower bars having their connected end portions curved rearwardly, and resilient elements connected with said supporting bearings and being adapted to be attached to an automobile.

7. In combination, an automobile bumper comprising a flat upper bar, a flat lower bar, said upper and lower bars disposed vertically edgewise and extending parallel in spaced relation with respect to each other, said upper and lower bars being connected together at respective ends thereof, said bar ends being offset to establish the vertical alignment thereof relatively to each other, said upper and lower bars provided with associated support bearings formed by twisting portions thereof to extend at right angles relatively to the edgewise disposition of said upper and lower bars, said support bearings being disposed rearwardly to position the forward edges thereof on an even plane with the front face of respective upper and lower bars, said upper and lower bars having their connected end portions curved rearwardly, and resilient elements connected with said supporting bearings and being adapted to be attached to an automobile, the front faces of said elements extending on an even plane with respect to the front edges of said support bearings.

In testimony whereof I affix my signature.

ALBERT L. KERN.